US008147782B2

(12) United States Patent
Rishea et al.

(10) Patent No.: US 8,147,782 B2
(45) Date of Patent: Apr. 3, 2012

(54) PRODUCING NICKEL HYDROXIDE SUITABLE FOR PELLETIZATION WITH IRON-CONTAINING ORE AND FOR STAINLESS STEEL MANUFACTURE

(75) Inventors: Marc Murray Rishea, Burlington (CA); Indje Ognianov Mihaylov, Mississauga (CA); Mohamed Buarzaiga, Mississauga (CA); Flavia Dutra Mendes, Minas Gerais (BR)

(73) Assignee: Vale Inco Limited, Toronto (CA)

( * ) Notice: Subject to any disclaimer, the term of this patent is extended or adjusted under 35 U.S.C. 154(b) by 20 days.

(21) Appl. No.: 12/235,882

(22) Filed: Sep. 23, 2008

(65) Prior Publication Data

US 2009/0087361 A1 Apr. 2, 2009

Related U.S. Application Data

(60) Provisional application No. 60/975,971, filed on Sep. 28, 2007.

(51) Int. Cl.
*B01D 11/04* (2006.01)
*B01D 21/00* (2006.01)
*C01G 53/04* (2006.01)

(52) U.S. Cl. ........ 423/139; 210/634; 210/638; 210/639; 210/702; 210/723; 210/724; 423/138; 423/140; 423/150.1

(58) Field of Classification Search .................... 75/738, 75/711, 722, 739, 740; 423/139, 140, 49, 423/50, 24, 99, 101–106, 594.19; 210/634, 210/638, 639, 702, 723, 724
See application file for complete search history.

(56) References Cited

U.S. PATENT DOCUMENTS 3,787,301 A * 1/1974 Bozec et al. ................. 205/590
(Continued)

FOREIGN PATENT DOCUMENTS

CA 973829 2/1975
(Continued)

OTHER PUBLICATIONS

Maljkovic et al., "Extraction of Co(II) and Ni(II) with Cyanex 272". In: EMC '91: Non-ferrous metallurgy—Present and Future. First European Metals Conference, Sep. 15-20, 1991, Brussels, Belgium. Institution of Minin and Metallurgy, 1991, pp. 175-181.

(Continued)

*Primary Examiner* — Jerry Lorengo
*Assistant Examiner* — Jared Wood
(74) *Attorney, Agent, or Firm* — Arent Fox LLP

(57) ABSTRACT

A process for producing a purified nickel hydroxide precipitate from a nickel-containing leach solution with impurities including one or more of the following: manganese, copper, zinc, iron and/or cobalt, so that the purified nickel hydroxide is suitable for pelletization with iron-containing ores and/or stainless steel production, includes treating the leach solution with a base to form a slurry of mixed hydroxide precipitate and low-nickel barren solution, thickening the slurry to form filter cake, washing the filter cake and contacting it with acid to dissolve nickel and other metals to produce a concentrated nickel-containing solution, subjecting the concentrated nickel-containing solution to solvent extraction with an organic acid extractant to remove metals other than nickel from the nickel-containing solution and form a solvent extraction raffinate of purified nickel solution and treating the solvent extraction raffinate with a base to precipitate the purified nickel hydroxide precipitate.

17 Claims, 2 Drawing Sheets

10 Ni Feed (Laterite ore)
14 Leaching (High Pressure or Atmospheric or Heap Leach
$CaCO_3/Ca(OH)_2$ 104 16 26
18 Counter-Current Decantation and/or Partial Neutralization of Leach Solution
Leach residue and/or Iron precipitate
CaO or $Ca(OH)_2$ or MgO 12 48
100 20 MHP precipitation
CaO or $Ca(OH)_2$ or MgO
Residual Ni precipitation 24
Barren Ni Effluent treatment 32
22 Solid/liquid separation
liquid 30
$H_2SO_4$ solid
28 MHP dissolution
solid 34 50
36 filtration
Impure Metal-Containing Product
base (NaOH or $Na_2CO_3$) / $H_2SO_4$
38 Purification SX 40
Impure Metal Strip Solution For Further Refining
MgO 42
44 NiHP precipitation
NiHP product 102
46 low Ni barren Solution 48

U.S. PATENT DOCUMENTS

| | | | | |
|---|---|---|---|---|
| 4,600,435 | A | 7/1986 | Wiegers et al. | 75/119 |
| 4,900,522 | A | 2/1990 | Chou et al. | 423/139 |
| 5,855,858 | A | 1/1999 | Jones | 423/150.1 |
| 2002/0012621 | A1 * | 1/2002 | Jones | 423/139 |
| 2004/0228783 | A1 * | 11/2004 | Harris et al. | 423/140 |

FOREIGN PATENT DOCUMENTS

| | | | |
|---|---|---|---|
| WO | WO 02 22897 | A1 | 3/2002 |
| WO | WO 2006/069416 | A1 * | 7/2006 |
| WO | WO 2006 069416 | A1 | 7/2006 |

OTHER PUBLICATIONS

White, D.T. et al., “Impurity Disposition and Control in the Ravensthorpe Acid Leaching Process” *Iron Control Technologies*, Dutrizac, J.E. et al. ed., Proceedings of the The Third International Symposium on Iron Control in Hydrometallurgy, Montreal, Canada, Oct. 1-4, 2006 (organized by the Hydrometallurgy Section of the Metallurgical Society of The Canadian Institute of Mining, Metallury and Petroleum), pp. 591-609.

* cited by examiner

PRODUCING NICKEL HYDROXIDE SUITABLE FOR PELLETIZATION WITH IRON-CONTAINING ORE AND FOR STAINLESS STEEL MANUFACTURE

RELATED APPLICATION

This application claims priority from U.S. provisional patent application 60/975,971 which was filed on Sep. 28, 2007.

BACKGROUND OF THE INVENTION

The present invention relates to a process for producing high purity nickel hydroxide precipitate (NiHP) from nickel-containing feed solutions derived from the dissolution of nickeliferous lateritic ores or other nickel-containing feed materials such as concentrates or mattes, the NiHP being suitable for pelletization with iron-containing ores and for stainless steel production.

The addition of such suitably produced NiHP into iron containing ores (iron ore, laterite ore and/or mixtures thereof) allows for the production of nickel pig iron with high enough nickel content (8-20%) to make it suitable for the manufacture of 300 series stainless steels. For this to be successful, however, the nickel hydroxide feed must be available from an economically viable source and must be substantially free from impurities that are deleterious to stainless steel manufacture and performance.

Suitably produced high purity NiHP can be further processed to produce high purity UTILITY® nickel product. (UTILITY is a trademark of Vale Inco Limited).

There are a variety of known processes for metal extraction from nickeliferous lateritic ores. Examples include high pressure acid leaching (HPAL), atmospheric acid leaching (AL) or heap leaching (HL) of lateritic ores. These processes for nickel recovery from lateritic ores, produce a leach solution which contains, along with the nickel, a number of other impurities such as iron, aluminum, chromium, silica, copper, zinc and, most notably, cobalt and manganese.

A number of known separation processes are available for removing these impurities from the nickel-containing leach solution. These include metal hydrolysis and precipitation (which may include prior oxidation or reduction of dissolved metal species), sulfide precipitation, ion-exchange, or solvent extraction (SX).

Because nickel laterites are not amenable to significant upgrading (unlike most nickel-bearing sulfide ores), almost the entire ore must be leached, thus producing dilute, typically 3-7 g/L Ni, nickel-containing leach solution. It is therefore a major challenge to invent a simple and cost-effective process to recover the value metals from laterites.

The known options generally fall into two categories.

One category is the indirect route that produces an intermediate precipitate which contains nickel in a substantially more concentrated form after some of the metal impurities, typically Fe, Al and Cr, have been removed. The intermediate precipitate is then releached and the concentrated nickel-containing solution is further refined through several steps to produce purified nickel solution from which nickel is recovered to a marketable nickel product.

The other category is the direct route which produces the purified nickel solution without pre-concentrating via an intermediate precipitate.

One example of the direct route is used in the Bulong HPAL plant in Western Australia which uses solvent extraction to remove cobalt, manganese, copper and zinc from the dilute leach solution after Fe, Cr and Al removal by hydrolysis and precipitation, to produce a purified nickel solution from which nickel is transferred, by another solvent extraction process, into a concentrated solution suitable for nickel recovery by electrowinning.

The Vale Inco Goro Nickel HPAL process also uses the direct route approach. Impurities such as Fe, Cr, Al, Si and Cu are removed by hydrolysis and precipitation, and by ion-exchange for the remaining Cu, followed by solvent extraction to separate Ni, Co and Zn away from Mn and other impurities. This solvent extraction step also serves as a concentration step as it transfers Ni, Co and Zn into a concentrated chloride solution. This solution is then treated for Zn removal by ion-exchange, and finally Co is separated from Ni by another solvent extraction step to produce a pure nickel chloride solution from which Ni is recovered by pyrohydrolysis as a high-purity nickel oxide suitable for the stainless steel market.

In the indirect approach, nickel is precipitated as a mixed sulfide precipitate (MSP) or as a mixed hydroxide precipitate (MHP). Examples of processes based on MSP include one used in the Moa Bay plant in Cuba, the Murrin-Murrin plant in Western Australia and the Coral Bay Nickel plant in the Philippines. The MSP intermediate is further refined through a number of operating steps either within the same plant (e.g., the Murrin-Murrin plant) or it is shipped for refining elsewhere (as in the Moa Bay and Coral Bay plants).

For example, at the Murrin-Murrin HPAL plant, after iron removal, hydrogen sulfide is used to produce an intermediate mixed Ni/Co sulfide (also containing other impurities such as Cu and Zn). The mixed sulfide is then pressure leached under oxidizing conditions to produce a concentrated Ni solution, from which the impurities (Cu, Zn, Co) are sequentially removed by hydrolysis and solvent extraction to produce a purified nickel solution from which nickel is recovered by hydrogen reduction.

Both Cawse and Ravensthorpe HPAL plants in Western Australia use precipitation of nickel as intermediate nickel/cobalt mixed hydroxide precipitate or MHP, using MgO as a base, to separate the pay metals from manganese. The MHP is then redissolved in ammonia/ammonium carbonate solution and the solution is further treated through another series of refining steps, including hydrolysis/precipitation, solvent extraction, ion-exchange, etc., to produce purified nickel solution from which nickel is recovered to a marketable product (nickel oxide or nickel metal).

One advantage of the indirect route is that it provides a break in the process allowing for greater flexibility and operational independence of the front-end leaching and back-end refining circuits.

A disadvantage of the MSP based processes, however, is the generally high capital costs associated with building the necessary $H_2S$ plant and associated services. A further disadvantage is that subsequent hydrometallurgical refining of the MSP typically requires a costly pressure oxidative leaching step.

Producing an MHP intermediate does not suffer from these MSP disadvantages. However, the known commercially practiced MHP based processes (e.g., Cawse and Ravensthorpe) rely on ammonia chemistry to achieve additional separation of Ni and Co from Mn upon dissolution of MHP in the ammonia/ammonium carbonate solution because of the significant transfer of Mn into the MHP intermediate. For example, as reported for the Ravensthorpe project (see D. T. White, et al., "Impurity Disposition and Control in the Ravensthorpe Acid Leaching Process," CIM Iron Control Technologies Symposium, Montreal, 2006, eds J. Dutrizac and P. Riveros), the Ni:Mn mass ratio increases only about three times across the MHP circuit, between the ratio in the solution feed to the MHP circuit (about 4.6) and the ratio in the MHP solids (about 14.4).

One disadvantage of the ammonia/ammonium carbonate releach of the MHP intermediate is the phenomenon of MHP ageing where there is notable reduction in the extent of Ni and Co redissolution from MHP that has been stored for a period of time.

A further disadvantage of the ammonia based chemistry is the technical difficulty, and associated significant cost, to meet increasingly strict environmental limits for ammonia in discharge effluent. This is particularly relevant for locations where operating a zero-discharge facility is not feasible.

Yet another disadvantage of the ammonia based chemistry is the need for ammonia recycle within the refining process. Ammonia recycle typically employs an ammonia lime boil operation and this operation is very energy intensive.

Accordingly, it would be beneficial to provide a simpler, and thus potentially more cost effective process which will produce an intermediate MHP product and then refine it to a purified nickel hydroxide precipitate (NiHP) product that is suitable for pelletization with iron-containing ores and also has sufficient purity such that it is directly suitable for stainless steel production, while avoiding the disadvantages and limitations of the ammonia-based MHP refining processes.

It would be a further advantage to provide a process whereby the purified NiHP can be produced from other nickel-containing feed sources such as concentrates or mattes.

It would be a further advantage to provide a process that is effective at producing and refining MHP derived from leach solutions of laterite ores of widely different compositions and therefore containing a wide range of impurities such as Cu, Zn, Fe, and Mn as well as cobalt.

SUMMARY OF THE INVENTION

A process for producing a purified nickel hydroxide precipitate according to the invention, starts with a nickel-containing leach solution having impurities including at least one of manganese, copper, zinc, iron and cobalt, so that the nickel hydroxide precipitate is suitable for pelletization with iron-containing ores and/or can be used for stainless steel production.

The process includes treating the nickel-containing leach solution, preferably under limited oxygen ingress conditions and at atmospheric pressure, with at least one base to form a slurry containing a mixed hydroxide precipitate and a low-nickel barren solution.

The slurry is then thickened to form a mixed hydroxide precipitate filter cake, and the filter cake is washed to remove entrained barren solution. The washed filter cake is then contacted with acid to dissolve nickel and other metals contained in the filter cake to produce a concentrated nickel-containing solution of higher nickel concentration than was in the nickel-containing leach solution.

The process further includes subjecting the concentrated nickel-containing solution to solvent extraction with an organic acid extractant to remove metals other than nickel from the nickel-containing solution, and form a solvent extraction raffinate of purified nickel solution. The purified nickel solution is then treated with a base to form purified nickel hydroxide precipitate (NiHP) slurry. The slurry is then thickened to form a mixed hydroxide precipitate filter cake, and the filter cake is washed to remove entrained barren solution.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

Referring to the drawings.

PREFERRED EMBODIMENT OF THE INVENTION

Figure 1:
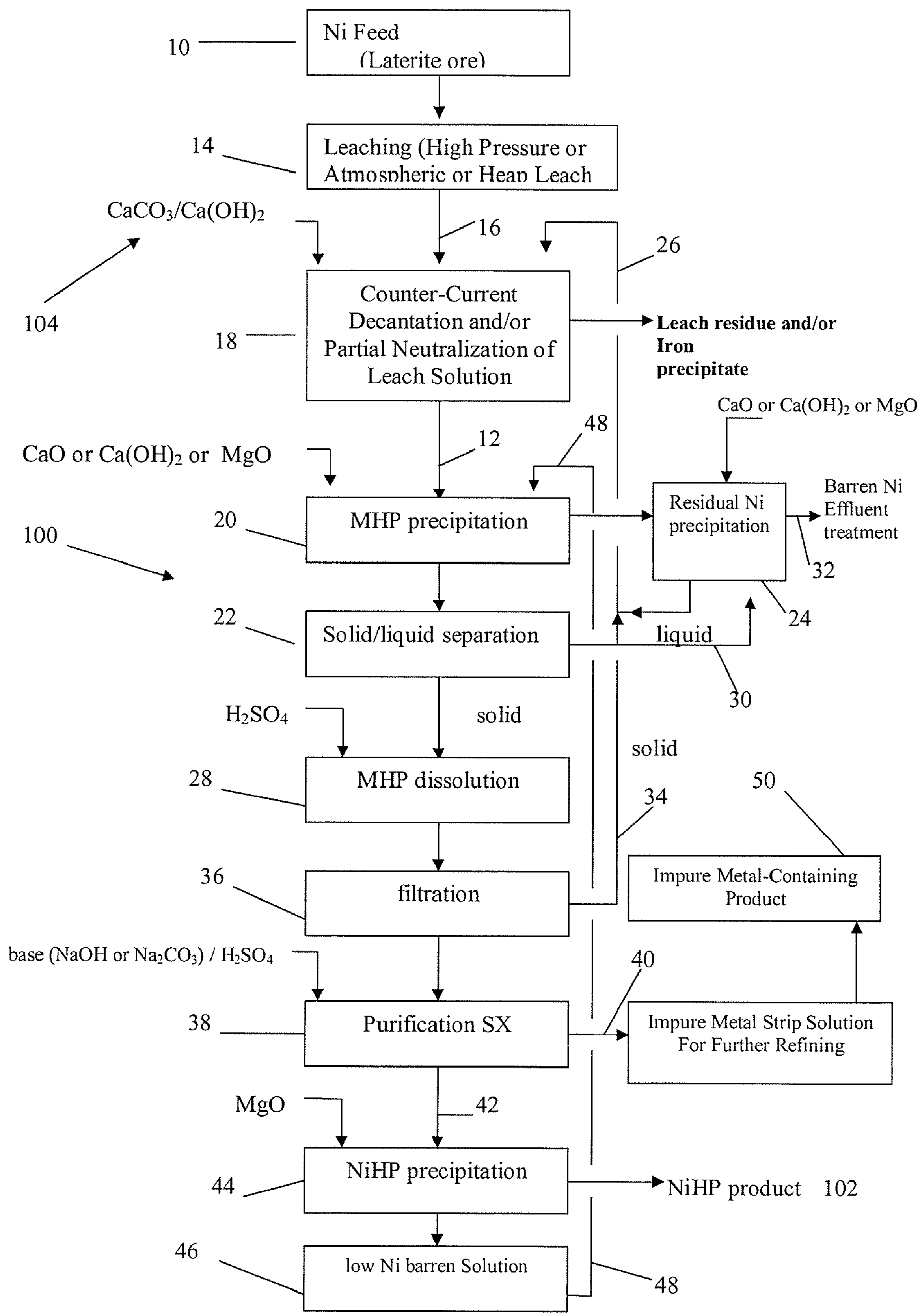
FIG. 1 is a flow chart illustrating a process according to the present invention for producing high purity nickel hydroxide precipitate (NiHP) that is suitable for pelletization with iron-containing ores and/or for stainless steel production.

Referring to the drawings, FIG. 1 illustrates a process 100 according to the present invention, for producing high purity nickel hydroxide precipitate (NiHP) product at 102, that is suitable for pelletization with iron-containing ores and is suitable for use in stainless steel production or is suitable for use in stainless steel production.

Starting from a source of nickel such as nickeliferous lateritic ores at 10, impure nickel-containing leach solution that contains at least one of manganese (Mn), copper (Cu), zinc (Zn), iron (Fe) and/or cobalt (Co) impurities at 12, is produced by a process 104, in a variety of known ways. Other sources of nickel include concentrates and mattes.

For example, high pressure acid leaching (HPAL), heap leaching (HL), atmospheric leaching (AL) or combinations thereof, illustrated at 14, are used to treat the nickeliferous laterite ores, to produce a leach solution at 16, which contains, along with nickel, a number of other impurities such as iron, aluminum, chromium, silica, copper, zinc and, most notably, cobalt and manganese. This leach solution is treated by known methods at 18 to remove the majority of contained acid, iron, aluminum and chromium, to prepare the impure nickel-containing leach solution at 12.

The nickel-containing leach solution from 12 is treated at 20 with a suitable base such as magnesium oxide (MgO), calcium oxide (CaO) and/or hydroxide ($Ca(OH)_2$) to precipitate a mixed hydroxide (MHP) intermediate. This precipitation is carried out under conditions that limit the ingress of oxygen into the precipitation reactors, in order to reduce the amount of co-precipitated manganese.

The conditions that limit the ingress of oxygen are achieved through a variety of ways such as, for example, selecting a suitable type of impeller for agitation in reactor tanks at 20, and/or providing an oxygen displacing atmosphere, such as nitrogen, in a gas space above the agitated reactor tanks at 20. The precipitation produces an MHP slurry comprising the MHP solids and a first low-Ni barren solution containing the majority of the manganese. Excess liquid from precipitation step 20 is supplied to a residual nickel precipitation step 24 for extraction of additional nickel from this excess liquid.

The MHP slurry is thickened and filtered at 22 to produce an MHP filter cake. The MHP filter cake is advantageously washed to remove entrained barren solution and thus reduce the amount of Mn that would otherwise transfer as entrained barren solution to the next step of MHP processing of the invention. The washing liquid is supplied at 30 to the step 24 where the remaining nickel from the washing liquid, together with the nickel from the first low-Ni barren solution, can be recovered by precipitation using a suitable base such as CaO, or MgO or $Ca(OH)_2$. This remaining nickel is returned to a suitable point in the process at 26, such as the leach solution acid neutralization step 18. The barren solution is discharged at 32 and subjected to effluent treatment.

The MHP filter cake from 22 is contacted with sulfuric acid ($H_2SO_4$) or other suitable acid of suitable strength at 28 to dissolve the nickel and cobalt, as well as other contained metals such as copper, zinc, iron, manganese, magnesium and others, and is filtered at 36 to produce a concentrated nickel-containing solution of higher nickel concentration than was in the leach solution feed to the MHP precipitation circuit at line 12.

Although concentrated sulfuric acid is preferably used, sulfuric acid of lower strength can be used instead, if required. Lower concentration of sulfuric acid can be used, for example, in situations when it is operationally more convenient to do so, such as when sulfuric acid of a certain concentration (preferably, a minimum of 150 g/L $H_2SO_4$) is already available because of an already existing process, or for process requirements elsewhere in the plant. Although using concentrated acid is preferable because it minimizes the volume of water that the acid addition brings, it is not the only choice. If acid of lower acid concentration is used, then the volume of the produced solution after the MHP dissolution step 28, will be greater and therefore larger equipment will be needed for all circuits of the process.

Returning to the process, any remaining residue is either sent for residue disposal since the paymetal content is typically very low, or is returned to the process at a suitable point along a line 34, such as to the counter-current decantation and/or leach solution acid neutralization step 18.

In those cases when the nickel feed source is concentrate or matte, it may not be necessary to employ the intermediate step of MHP precipitation because the leach solution from 12 may already be concentrated (typically higher than 30 g/L Ni) and the manganese content will typically be also low. In those cases, the solution from 12 may be directed to step 38 as will be explained more fully in connection with FIG. 2.

Impurities such as copper, zinc, iron, manganese and cobalt are selectively removed from the concentrated nickel solution by solvent extraction (SX) at 38, using an organic solution comprising a suitable extractant, dissolved in an appropriate diluent, and selected from the group of organophosphorus acid extractants such as an organophosphinic acid extractant. An example of such an extractant is bis(2,4,4-trimethylpentyl)phosphinic acid, commercially available, for example, as Cyanex® 272 from Cytec Canada Inc. The organic solution may also comprise organic modifiers (such as tri-butyl phosphate, TBP) and/or antioxidants (such as butyl hydroxy toluene, BHT). A suitable diluent is preferably selected from the group of low-aromatic or all-aliphatic liquid hydrocarbon diluents having flash point of at least 65° C. Specific examples include commercially available diluents from Exxon Mobil (such as those known by the trademarks Escaid 110 and Isopar M), from Shell Chemicals (such as those known by the trademarks ShellSol D70, ShellSol D80 or ShellSol D90), and other major oil refiners. A suitable base solution, such as $Na_2CO_3$ or NaOH, is used to ensure the required pH is maintained during the extraction process. For this purpose the selected pH range should be about 4.5 to 6.5, or preferably about 5.0 to 6.0 or most preferably about 5.3 to 5.6.

The base solution is advantageously added to pre-neutralize the acid-stripped organic just prior to metal extraction. It is also preferable to keep the calcium level in the aqueous feed solution to extraction below saturation level to minimize the possibility for gypsum precipitation in the extraction section 38 of the solvent extraction circuit. One way to do this is by adding an appropriate amount of low-calcium containing solution to the aqueous feed solution to extraction. Examples of low-calcium containing solution to be used include spent base solution after it has been separated from organic, low-nickel barren solution as will be described in connection with steps 44 and 46 below, and water. The addition rate is anywhere between 5 and 35% of the aqueous feed solution to extraction. The rate mainly depends on how much calcium is present in the low-calcium solution to be used.

The extracted impurities are stripped from the organic solution using suitable acid, such as sulfuric acid ($H_2SO_4$), to produce an impure metal strip solution at 40. This impure metal solution is further treated by a variety of known processes to form an impure metal precipitate at 50, for further refining. Examples include treatment by a sulfiding agent, such as $H_2S$, NaSH or $Na_2S$, to remove selectively copper and zinc and then cobalt as sulfide precipitates, leaving a manganese-rich barren liquor which is suitably treated for manganese removal and/or recovery prior to disposal to effluent. Alternatively, the impure metal solution at 40 is treated with a suitable base (an oxide, hydroxide or carbonate) reagent to produce an impure metal hydroxide or carbonate which can be further refined to recover valuable metals. Yet another option is to selectively remove manganese from the impure metal solution by oxidative precipitation using a suitable oxidant, such as $SO_2$/oxygen, and the remaining metals are precipitated in a form suitable for further refining, such as as hydroxides, carbonates or sulfides.

The solvent extraction raffinate at 42 represents a purified nickel solution containing at most trace levels of impurities such as copper, zinc, iron and manganese, as well as very low levels of cobalt. This purified nickel solution is then treated at 44 with a suitable base, such as MgO, to precipitate purified nickel hydroxide (NiHP) at 102.

In order to limit the amount of Mg content of the NiHP, it is advantageous to leave a small portion of the nickel in a second low-Ni barren solution at 46. The second low-nickel barren solution is returned along 48, to recover the residual nickel, and back into the process at a suitable point, such as to the MHP precipitation circuit 20. Alternatively, the residual nickel can be selectively recovered from the magnesium containing solution by selective ion-exchange, using a variety of chelating ion-exchange resins such as those with iminodiacetic acid or bispicolyl amine functionality, or by sulfide precipitation with a suitable sulfiding agent such as $H_2S$, NaSH or $Na_2S$, or by precipitation with a suitable base such as $Na_2CO_3$, CaO, $Ca(OH)_2$ or MgO.

The NiHP slurry is thickened and filtered in 44 to produce an NiHP filter cake at 102. The NiHP filter cake is advantageously also washed in 44 to remove entrained barren solution and thus reduce the amount of Mg and other impurities that would otherwise transfer as entrained barren solution into the NiHP product. Furthermore, the moisture of the NiHP filter cake is reduced to between 10 and 30% by partial drying.

Unlike the prior MHP precipitate purification process that required ammonia chemistry, the process of the invention does not require or use ammonia chemistry to form the high purity nickel hydroxide precipitate.

Figure 2:
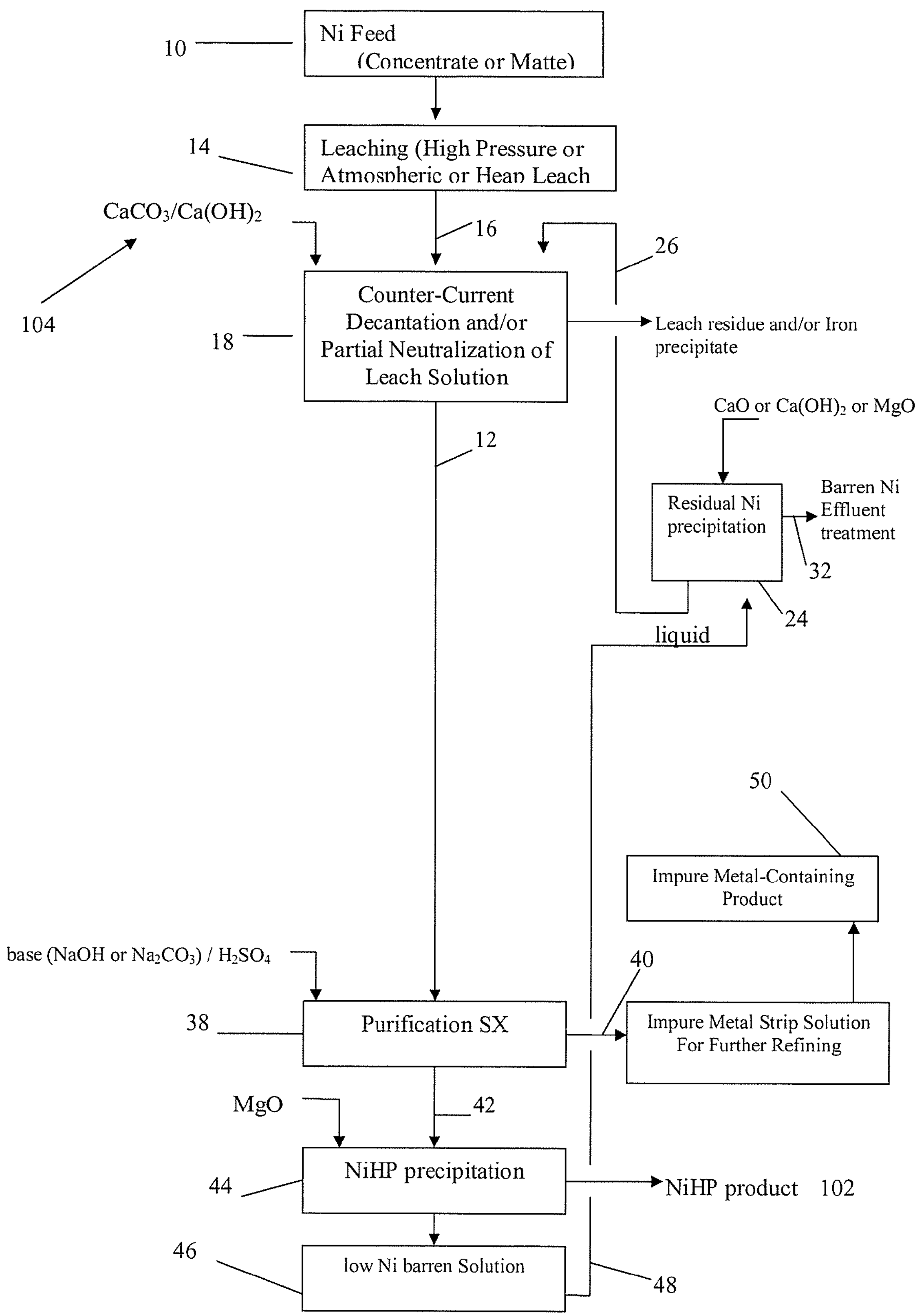
FIG. 2 is a view similar to FIG. 1 of an alternate embodiment of the invention.

Referring now to FIG. 2, where the same reference numerals are used to designate the same or functionally similar features, the embodiment of the invention illustrated is particularly suitable for a nickel feed from 10 that is either a concentrate or a matte. In this case the leach solution feed 12 is supplied directly to step 38 for removal of impurities such as copper, zinc, iron, manganese and cobalt, by selective removal from the concentrated nickel solution by solvent extraction using the organic solution. After the precipitation step 44 that extracts the NiHP product at 102, the low-nickel barren solution from step 46 is returned along 48, to recover the residual nickel, back into the process at a suitable point, such as to the step 24. The remaining steps are the same as for the embodiment of FIG. 1. It is recognized that certain changes to the leaching operations in step 14 may be necessary, such as the use of pressure oxidizing leach with oxygen or another suitable oxidant, and that, depending on the copper level in the nickel-containing feed material, a separate copper removal step by suitable means, such as solvent extraction, sulfide precipitation, cementation and the like, may be required.

EXAMPLES

Example 1

This example illustrates, through three separate tests, continuous MHP production using MgO and the effect of MgO dosage on metal precipitation and MHP composition. In this example, the precipitation is carried out under a nitrogen blanket. When compared with the results given in Example 2—tests carried under the same conditions (at 50° C. and same residence time per reactor) and with the same feed solution, however without using a nitrogen blanket—the results illustrate the reduced extent of Mn coprecipitation, thus resulting in an increased Ni:Mn ratio in the product MHP.

Example 1

| | | Test# | | |
|---|---|---|---|---|
| | | 1 | 2 | 3 |
| | | Stoich MgO/(Ni + Co) Ratio: | | |
| | | 0.85 | 0.95 | 1.05 |
| | | Average pH in Discharge: | | |
| | | 7.6 | 7.7 | 7.8 |
| | | Final Reactor Solution g/l | | |
| Feed Solution g/l | | | | |
| Ni | 4.65 | 0.76 | 0.43 | 0.25 |
| Co | 0.46 | 0.02 | 0.01 | 0.01 |
| Ca | 0.56 | 0.61 | 0.62 | 0.60 |
| Mg | 6.4 | 7.9 | 8.2 | 7.9 |
| Mn | 2.58 | 2.32 | 2.26 | 2.12 |
| S | 13.3 | 13.1 | 13.1 | 12.6 |
| Zn | 0.08 | <0.006 | <0.006 | <0.006 |
| MHP Solids % | | | | |
| Ni | | 38.3 | 36.7 | 35.3 |
| Co | | 4.27 | 4.05 | 3.76 |
| Ca | | 0.2 | 0.2 | 0.2 |
| Mg | | 2.36 | 2.79 | 2.70 |
| Mn | | 2.99 | 3.46 | 3.96 |
| S | | 5.0 | 4.8 | 4.6 |
| Zn | | 0.82 | 0.75 | 0.70 |
| Ni Extraction % | | 83.9 | 90.9 | 94.6 |

Example 2

This example illustrates, through three separate tests, continuous MHP production using MgO and the effect of MgO dosage on metal precipitation and MHP composition. In this example, the precipitation is carried out without a nitrogen blanket. When compared with the results given in Example 1—tests carried under the same conditions and with the same feed solution, however without using a nitrogen blanket—the results illustrate the reduced extent of Mn coprecipitation, thus resulting in an increased Ni:Mn ratio in the product MHP.

Example 2

| | | Test# | | |
|---|---|---|---|---|
| | | 7 | 8 | 9 |
| | | Stoich MgO/(Ni + Co) Ratio: | | |
| | | 0.85 | 0.95 | 1.05 |
| | | Average pH in Discharge: | | |
| | | 7.5 | 7.5 | 7.7 |
| | | Final Reactor Solution g/l | | |
| Feed Solution g/l | | | | |
| Ni | 4.65 | 1.24 | 0.84 | 0.35 |
| Co | 0.46 | 0.04 | 0.02 | 0.00 |
| Ca | 0.56 | 0.58 | 0.60 | 0.60 |
| Mg | 6.4 | 7.6 | 8.0 | 7.9 |
| Mn | 2.58 | 2.22 | 2.18 | 1.99 |
| S | 13.3 | 12.6 | 12.8 | 12.5 |
| Zn | 0.08 | <0.006 | <0.006 | <0.006 |
| MHP Solids % | | | | |
| Ni | | 31.6 | 36.0 | 36.0 |
| Co | | 3.87 | 4.28 | 3.94 |
| Ca | | 0.3 | 0.1 | 0.1 |
| Mg | | 2.60 | 2.98 | 3.32 |
| Mn | | 3.07 | 4.00 | 4.61 |
| S | | 4.3 | 4.9 | 4.9 |
| Zn | | 0.75 | 0.85 | 0.74 |
| Ni Extraction % | | 73.7 | 82.2 | 92.6 |

Example 3

This example illustrates continuous MHP production using CaO and the beneficial effect of a nitrogen blanketing (tests 1-4 without nitrogen and tests 5-6 with nitrogen blanket). The tests are carried under otherwise the same conditions (at 50° C. and same residence time per reactor) and with the same feed solution. The results illustrate (tests 5 and 6) the reduced extent of Mn coprecipitation, thus resulting in an increased Ni:Mn ratio in the product MHP. Note that tests 2 and 3 are directly comparable (same Ni extraction) to tests 5 and 6, respectively. The Ni:Mn ratio in MHP increases from 5.9 (test 2—no N2) to 11.0 (test 5—with N2) for Ni recovery of 88-89%, and for a nickel recovery of 97-98%, the Ni:Mn ratio in MHP increases from 3.7 (test 3—no N2) to 7.5 (test 6—with N2).

Tests 1-4 are without nitrogen blanket:

Example 3

| | | Test # | | | |
|---|---|---|---|---|---|
| | | 1 | 2 | 3 | 4 |
| | | pH Control | | | |
| | | 7.2 | 7.5 | 7.8 | 8.1 |
| | | Final Reactor Solution g/l | | | |
| Feed Solution, g/L | | | | | |
| Ni | 5.65 | 1.56 | 0.62 | 0.11 | 0.02 |
| Co | 0.58 | 0.18 | 0.10 | 0.03 | 0.01 |

Example 3-continued

| | | Test # | | | |
|---|---|---|---|---|---|
| | | 1 | 2 | 3 | 4 |
| | | pH Control | | | |
| | | 7.2 | 7.5 | 7.8 | 8.1 |
| | | Final Reactor Solution g/l | | | |
| Ca | 0.55 | 0.51 | 0.54 | 0.50 | 0.54 |
| Mg | 24.8 | 24.5 | 26.2 | 24.1 | 25.1 |
| Mn | 2.65 | 2.05 | 1.86 | 1.19 | 0.83 |
| Zn | 0.11 | <0.006 | <0.006 | <0.006 | <0.006 |
| MHP Solids, % | | | | | |
| Ni | | 17.9 | 16.0 | 13.4 | 12.2 |
| Co | | 1.78 | 1.54 | 1.35 | 1.23 |
| Ca | | 14.6 | 13.9 | 14.5 | 13.7 |
| Mg | | 0.71 | 0.75 | 1.36 | 1.75 |
| Mn | | 2.70 | 2.72 | 3.58 | 4.08 |
| S | | 12.1 | 11.8 | 12.3 | 11.5 |
| Zn | | 0.56 | 0.37 | 0.27 | 0.25 |
| Ni Extraction % | | 72.3 | 89.1 | 98.1 | 99.6 |

Tests 5-6 are with nitrogen blanket:

Example 3 (cont.)

| | | Test # | |
|---|---|---|---|
| | | 5 | 6 |
| | | pH Control | |
| | | 7.5 | 7.8 |
| | | Final Reactor Solution g/l | |
| Feed Solution, g/L | | | |
| Ni | 5.65 | 0.69 | 0.17 |
| Co | 0.58 | 0.02 | 0.01 |
| Ca | 0.55 | 0.54 | 0.52 |
| Mg | 24.8 | 25.0 | 25.1 |
| Mn | 2.65 | 2.46 | 2.06 |
| Zn | 0.11 | <0.006 | <0.006 |
| MHP Solids, % | | | |
| Ni | | 17.1 | 16.4 |
| Co | | 1.50 | 1.32 |
| Ca | | 12.6 | 13.5 |
| Mg | | 0.65 | 0.74 |
| Mn | | 1.56 | 2.19 |
| S | | 10.4 | 11.5 |
| Zn | | 0.42 | 0.38 |
| Ni Extraction % | | 88.0 | 97.1 |

In relation to Examples 1-3, it is noted that typically the majority of copper present in the leach solution will report into the feed solution to MHP precipitation and will coprecipitate with the nickel and report into the MHP intermediate product. In these as well as subsequent examples (Examples 4-6), solutions originating from leaching of laterite ore with relatively high copper content are used. In those cases when the laterite ore contains less copper, the copper levels will correspondingly be lower. It is recognized that when the nickel feed sources are concentrates or mattes, which typically have higher copper levels, the quantity of copper reporting into the feed solution to solvent extraction will be higher.

Example 4

This example illustrates typical results from dissolution with sulfuric acid of MHP, precipitated using MgO, to produce a concentrated impure nickel solution.

Example 4

| | Ni | Co | Mn | Cu | Zn |
|---|---|---|---|---|---|
| MHP (wt %) | 37.7 | 3.5 | 5.0 | 0.5 | 0.9 |
| Leach solution (g/L) | 83.5 | 7.8 | 9.1 | 1.1 | 1.9 |
| Extraction (%) | 99.6 | 98.4 | 80.0 | 99.0 | 99.8 |

Example 5

This example illustrates the results from operating a continuous solvent extraction circuit to purify a concentrated impure nickel solution, generated from dissolution of MHP precipitated using CaO. Because the feed solution is saturated with calcium, water was added (to about 25% of the feed) to reduce the Ca level to below calcium solubility and thus prevent gypsum formation in the extraction stages. The organic solution comprises 20 vol % of Cyanex® 272 extractant (a commercially available reagent from Cytec Canada Inc.) in an aliphatic diluent and the extraction is carried out at 50° C. The stripped organic solution is contacted with 150 g/L $Na_2CO_3$ solution prior to extraction to pre-neutralize the acid extractant and ensure the required pH for metal extraction is maintained.

Example 5

| Stream | Ni (g/L) | Cu (g/L) | Co (g/L) | Mn (g/L) | Mg (g/L) | ZN (g/L) |
|---|---|---|---|---|---|---|
| Aqueous Feed | 40.8 | 0.83 | 3.25 | 4.15 | 1.01 | 0.78 |
| Raffinate | 38.1 | 0.0004 | 0.010 | 0.0015 | 0.80 | 0.0001 |
| Strip Prod | 0.2 | 4.4 | 15.7 | 20.5 | 0.71 | 4.26 |

Example 6

This example illustrates the results from operating a continuous solvent extraction circuit to purify a concentrated impure nickel solution, generated from dissolution of MHP precipitated using MgO. The same organic solution is used as in Example 5, and the extraction is also carried out at 50° C. The stripped organic solution is contacted with 150 g/L $Na_2CO_3$ solution prior to extraction to pre-neutralize the acid extractant and ensure the required pH for metal extraction is maintained.

Example 6

| Stream | Ni (g/L) | Cu (g/L) | Co (g/L) | Mn (g/L) | Mg (g/L) | Fe (g/L) | Zn (g/L) |
|---|---|---|---|---|---|---|---|
| Aqueous Feed | 73.6 | 1.39 | 6.02 | 5.39 | 5.73 | 0.12 | 2.07 |
| Raffinate | 60.4 | 0.002 | 0.091 | 0.004 | 3.77 | 0.002 | 0.001 |
| Strip Product | 0.66 | 7.1 | 31.8 | 26.2 | 5.5 | 0.57 | 8.6 |

This example also illustrates the effective removal of iron, if present in the feed solution, thus ensuring the production of a purified nickel solution (the raffinate) containing only traces of impurities such as Cu, Mn, Fe and Zn as well as very low levels of cobalt.

Example 7

This example illustrates the results from precipitating Nickel Hydroxide (NiHP) from solvent extraction raffinate, as per Examples 5 and 6, using MgO. The precipitation is carried out in a continuous circuit with two agitated reactor tanks operating in series and at 50° C.

Example 7

| Stream | Ni | Cu | Co | Mn | Mg | Fe | Zn | Al | Si | S |
|---|---|---|---|---|---|---|---|---|---|---|
| Feed to NiHP precipitation (g/L) | 40-65 | <0.002 | 0.01-0.10 | 0.001-0.004 | 3.5-3.8 | <0.002 | <0.001 | | | |
| Barren solution after NiHP precipitation (g/L) | 1-2 | <0.001 | <0.002 | <0.001 | 18-19 | <0.002 | <0.001 | | | |
| NiHP (wt %) | 42-45 | <0.002 | 0.01-0.10 | <0.02 | 1-2 | ~0.10 | <0.01 | 0.03-0.06 | 0.05-0.10 | 2-4 |

It is noted that the Fe, Al and Si shown in this example are present in the NiHP product is a result of these impurities coming with the MgO material used for the tests.

This process allows a more effective rejection of Mn impurity (and thus improved Ni/Mn selectivity) during the precipitation of MHP by operating the precipitation under conditions where the oxygen ingress in the reactor tanks is minimized. The process further allows for a simpler processing route of converting MHP into a purified NiHP which has sufficient purity (by being very low in Cu, Co, Mn and Zn) to be used for pelletization with iron-containing ores and for stainless steel production. This simpler processing route avoids the use of ammonia-based separation chemistry known from the prior art for refining MHP and the known problems associated with the ammonia route such as reduced Ni and Co extraction from aged MHP and meeting ammonia discharge limits in effluent solutions.

Production of nickel hydroxide (NiHP) of suitable quality for pelletizing with iron-containing ores, such as iron ore and nickeliferous laterite ores and as feed for making UTILITY® nickel through pelletization, calcination (induration) and reduction, is thus achieved.

While specific embodiments of the invention have been shown and described in detail to illustrate the application of the principles of the invention, it will be understood that the invention may be embodied otherwise without departing from such principles.

What is claimed is:

1. A process for producing a purified nickel hydroxide precipitate from a nickel-containing leach solution, the nickel-containing leach solution having impurities including at least one of manganese, copper, zinc, iron and cobalt, so that the nickel hydroxide precipitate is suitable for at least one of pelletization with iron-containing ores and stainless steel production, the process comprising:

treating the nickel-containing leach solution under conditions limiting oxygen ingress and with at least one base to form a slurry containing a mixed hydroxide precipitate and a first low-nickel barren solution;

thickening and filtering the slurry to form a mixed hydroxide precipitate filter cake;

washing the mixed hydroxide precipitate filter cake to remove entrained barren solution;

contacting the washed filter cake with acid to dissolve nickel and other metals contained in the mixed hydroxide precipitate filter cake to produce a concentrated nickel-containing solution of higher nickel concentration than in the nickel-containing leach solution;

subjecting the concentrated nickel-containing solution to solvent extraction with an organic acidic extractant to remove metals other than nickel from the nickel-containing solution and form a solvent extraction raffinate of purified nickel solution and impurity-loaded organic solution;

adding a base to the acidic extractant to maintain a selected pH during the extraction process;

stripping the impurity-loaded organic solution with acid to form an impure metal strip solution;

treating the solvent extraction raffinate with a base to form a slurry containing purified nickel hydroxide precipitate and a second low-nickel barren solution;

thickening and filtering the slurry to form a purified nickel hydroxide precipitate filter cake;

washing the nickel hydroxide precipitate filter cake to remove entrained barren solution;

drying the nickel hydroxide precipitate filter cake;

precipitating the metal impurities from the impure metal strip solution to form an impure metal-containing product; and the process being free of ammonia chemistry.

2. The process of claim 1, wherein the at least one base for treating the nickel-containing leach solution to form the slurry is magnesium oxide.

3. The process of claim 1, wherein the at least one base for treating the nickel-containing leach solution to form the slurry is at least one of calcium oxide and calcium hydroxide.

4. The process of claim 1, including removing remaining nickel from a washing liquid of the step for washing the mixed hydroxide precipitate filter cake, by adding a base to the washing liquid and the first low-nickel barren solution to precipitate the remaining nickel and to leave the barren solution, and returning the precipitated remaining nickel to the process at a location that is upstream of the step of thickening the slurry to form the mixed hydroxide precipitate filter cake.

5. The process of claim 1, including removing remaining nickel from a washing liquid of the step for washing the mixed hydroxide precipitate filter cake, and remaining nickel from the first low-nickel barren solution, by adding a base selected from the group consisting of CaO, MgO and $Ca(OH)_2$ to the washing liquid and the first low-nickel barren solution to precipitate the remaining nickel and to leave the barren solution, and returning the precipitated remaining nickel to the process at a location that is upstream of the step of thickening the slurry to form the mixed hydroxide precipitate filter cake.

6. The process of claim 1, wherein the acid for contacting the washed mixed hydroxide precipitate filter cake is sulfuric acid.

7. The process of claim 1, including filtering the washed filter cake after contacting the washed filter cake with acid to dissolve the nickel and other metals with the acid, to form a filtrate and a remaining residue, and returning the remaining residue to a step of the process that is upstream of the step of contacting the washed filter cake with acid.

8. The process of claim 1, including subjecting the concentrated nickel-containing solution to the solvent extraction using an organic solution.

9. The process of claim 1, including subjecting the concentrated nickel-containing solution to the solvent extraction using an organic solution comprising an extractant dissolved in a diluent, the extractant being an organophosphorus acid extractant.

10. The process of claim 1, including subjecting the concentrated nickel-containing solution to the solvent extraction using an organic solution comprising an extractant and an additive dissolved in a diluent, the extractant being bis(2,4,4-trimethylpentyl)phosphinic acid; the additive being selected from the group consisting of: tri-butyl phosphate and butyl hydroxy toluene; the base for neutralizing the acidic extractant to form the solvent extraction raffinate of purified nickel solution being selected from the group consisting of: $Na_2CO_3$ and NaOH.

11. The process of claim 1, including adding a low-calcium containing solution to the concentrated nickel-containing solution during the solvent extraction step to limit gypsum precipitation in the solvent extraction step.

12. The process of claim 1, including providing a nitrogen blanket during the treatment of the nickel-containing leach solution with at least one base to form the slurry, to create the conditions limiting oxygen ingress and preventing oxidation of manganese.

13. The process of claim 1, including subjecting the concentrated nickel-containing solution to solvent extraction using an organic solution comprising an extractant and an additive dissolved in a diluent, the extractant being bis(2,4,4-trimethylpentyl)phosphinic acid; the additive being selected from the group consisting of:

tri-butyl phosphate and butyl hydroxy toluene; the base for neutralizing the acidic extractant to form the solvent extraction raffinate of purified nickel solution being selected from the group consisting of: $Na_2CO_3$ and NaOH.

14. The process of claim 1, wherein the base is added to the acidic extractant only before subjecting the concentrated nickel-containing solution to the solvent extraction.

15. A process for producing a purified nickel hydroxide precipitate from a nickel-containing leach solution having at least one of manganese, copper, zinc, iron and cobalt, as impurity, the process comprising:

treating the nickel-containing leach solution with a base to form a slurry containing a mixed hydroxide precipitate and a first low-nickel barren solution;

thickening the slurry to form a mixed hydroxide precipitate filter cake;

washing the mixed hydroxide precipitate filter cake;

contacting the washed filter cake with acid to dissolve nickel and other metals contained in the filter cake to produce a concentrated nickel-containing solution of higher nickel concentration than in the nickel-containing leach solution;

subjecting the concentrated nickel-containing solution to solvent extraction with an organic acid extractant to remove metals other than nickel from the nickel-containing solution and form a solvent extraction raffinate of purified nickel solution and impurity-loaded organic solution;

adding a base to the acidic extractant to maintain a selected pH during the extraction process;

stripping the impurity-loaded organic solution with acid to form an impure metal strip solution;

treating the solvent extraction raffinate with a base to form a slurry containing purified nickel hydroxide precipitate and a second low-nickel barren solution;

thickening and filtering the slurry to form a purified nickel hydroxide precipitate filter cake;

washing the nickel hydroxide precipitate filter cake to remove entrained barren solution;

drying the nickel hydroxide precipitate filter cake;

precipitating the metal impurities from the impure metal strip solution to form an impure metal-containing product; and the process being free of ammonia chemistry.

16. The process of claim 15, wherein the at least one base for treating the nickel-containing leach solution to form the slurry is selected from the group consisting of: magnesium oxide, calcium oxide and calcium hydroxide; the process including removing remaining nickel from a washing liquid of the step for washing the mixed hydroxide precipitate filter cake and from the first low-nickel barren solution after MHP precipitation, by adding a base to the washing liquid and the first low-nickel barren solution after MHP precipitation to precipitate the remaining nickel and to leave the barren solution, and returning the precipitated remaining nickel to the step of treating the nickel-containing leach solution with a base to form the slurry; the acid for contacting the washed mixed hydroxide precipitate filter cake being sulfuric acid; and including filtering the washed mixed hydroxide precipitate filter cake after dissolving the nickel and other metals with the acid, to from a filtrate and a remaining residue, and returning the remaining residue to the step of treating the nickel-containing leach solution with at least one base to form the slurry.

17. The process of claim 15, including subjecting the concentrated nickel-containing solution to solvent extraction using an organic solution comprising an extractant and an additive dissolved in a diluent, the extractant being bis(2,4,4-trimethylpentyl)phosphinic acid; the additive being selected from the group consisting of: tri-butyl phosphate and butyl hydroxy toluene; the base for neutralizing the acidic extractant to form the solvent extraction raffinate of purified nickel solution being selected from the group consisting of: $Na_2CO_3$ and NaOH.

* * * * *